Patented May 9, 1950

2,507,133

UNITED STATES PATENT OFFICE 2,507,133

NITRITE ESTER DILUENT POLYMERIZATION PROCESS

David W. Young, Roselle, N. J., and Harris D. Hineline, Mount Vernon, N. Y., assignors to Standard Oil Development Company, a corporation of Delaware No Drawing. Application July 13, 1946, Serial No. 683,417

3 Claims. (Cl. 260—91.1)

This invention relates to low temperature olefinic polymerization, relates especially to polymerization mixtures, and relates particularly to alkyl nitrite diluents in the polymerization mixture.

It has been found possible to obtain a very interesting and valuable family of relatively low m. wt. polymers and relatively low m. wt. copolymers by the polymerization at low temperatures of a wide variety of olefins and analogous unsaturates, including isobutylene, the di and tri olefins, styrene, and the various substituted styrenes, and the like by cooling the material to temperatures below 0° C. and polymerizing them by addition to the cold mixture of one or another of the Friedel-Crafts catalysts, the resulting polymers having molecular weights, depending upon the temperature, the purity of the mixture and other factors ranging from 1000 to about 150,000 (as determined by the Staudinger method). In some of these forms this reaction can be applied to the olefinic materials as such, but in most instances superior results are obtained if the reaction is applied in the presence of a diluent; especially if the diluent is a non-solvent for the finished polymer. To the present the principal diluents have been the low boiling hydrocarbons and the mono or poly halo alkyls, such as ethyl or methyl chloride, carbon disulfide, or the $C_2$ to $C_5$ petroleum hydrocarbons. None of these substances is, however, wholly satisfactory since all are soluble in the polymer itself, and are removed only with great difficulty and much of the diluent is lost because of this difficulty of removal; this item, especially with methyl chloride, resulting in an undesirable increase in cost of the polymer since the amount of methyl chloride required is nearly as great as the weight of the polymer obtained. The number of substances which can be used for diluents is greatly limited because of the fact that it is essential that the diluent be free from interference with the polymerization reaction and the polymerization catalyst. This requirement rules out practically all of the common solvents including all of the alcohols, all of the ordinary ethers, esters, aldehydes, acids, and the like, since all of them are so reactive with the catalyst that they either profoundly modify the character of the polymerization reaction, or destroy the catalytic power entirely.

It is now found, however, that the nitrite esters, in spite of the presence of considerable amounts of oxygen in the molecule, and the resulting low polar character, are usable diluents. The nitrites have highly advantageous melting and boiling points, permitting a convenient and easy separation from unpolymerized, ethylenically unsaturated material in the course of purification of materials for recycling. The nitrites are particularly useful as diluents because of the fact that the cold olefins are soluble in or mixable with the organic nitrites in any proportion, but the solid polymer is insoluble in the nitrites and has a very low solubility for the nitrites. Also, the characteristics of the nitrite esters as diluents are such that with some reactions the polymer obtained is conspicuously different in physical and chemical properties.

Thus the process of the invention mixes together one or more olefins or ethylenic unsaturates in the presence of a nitrite ester such as methyl or ethyl nitrite, and then polymerizes the mixture at a temperature within the range between 10° C. and —164° C. by the application to the cold mixture of a Friedel-Crafts catalyst, preferably in solution either in a further portion of the organic nitrite or in solution in some other low-freezing, non-complex-forming solvent; to yield a polymer or copolymer of any desired molecular weight. Other objects and details of the invention will be apparent from the following description:

In practicing the invention any of the ethylenic unsaturates may be used as the polymerizate material, that is isobutylene is an excellent polymerizate. Similarly, any of the mono olefins either normal or iso are usable if they have from 3 to 20 carbon atoms per molecule. Similarly, the multi-olefins especially the diolefins and triolefins such as butadiene, isoprene, piperylene, dimethyl butadiene, cyclopentadiene, dimethylallyl, myrcene allo-ocymene and the like; any of the multi-olefins having from 4 to 14 carbon atoms per molecule being usable. Similarly, the substituted unsaturates such as chloroprene, bromoprene, and the like without regard to the substituent are similarly usable. Likewise, the aromatic substituted ethylenic unsaturates such as phenyl ethylene, better known as styrene and its homologues and substituted analogues are similarly usable including such compounds as alpha halo styrene, para halo styrene and the like.

A particularly interesting group of polymerizable compounds are various of the unsaturated ethers, especially the vinyl isobutyl ether, the vinyl normal butyl ether, the vinyl methyl ether, the vinyl phenyl ethers, and the like, which are also excellent unsaturates for this type of low-temperature polymerization reaction, and it appears that any of the unsaturated ethers polymerize particularly well in the presence of nitrite ester diluents.

It may be noted that the vinyl methyl ether polymers show a substantial solubility and mixability with water and alcohol, both of these solubilities being incidental to the relatively high oxygen content in the polymer. It may be noted that these polymers show a relatively very small, or negligible, oil solubility, again because of the relatively high oxygen content. It should be noted also that these polymers tend to be of relatively moderate molecular weight and oily in character, and they are soluble in, or mixable with, the nitrite esters, from which they are readily separated by distillation of the nitrite ester. It should be noted that polymers containing the butyl vinyl ethers, because of the much higher ratio of carbon to oxygen, are insoluble in both water and alcohol and are readily soluble in the hydrocarbon oils and, in most instances, are mixable therewith. Also, these polymers, even though they are of moderate molecular weight such as to be heavy oils, are precipitated in oil form from the polymerized mixture.

The polymerization reaction which occurs with these unsaturated ethers in the presence of the nitrite esters appears to be particularly useful and it may well be that there is some interaction between the polar characteristic of the ester and the polar characteristic of the olefinic ethers, which improves the character of the polymerization.

It may be noted that by proper choice of catalyst and proper proportion of nitrite ester, any of the unsaturated ethers can be polymerized to a greater or less degree, and that most of them are valuable polymers.

Thus, these substances may be polymerized into the simple polymers in the presence of the nitrite ester diluent or a wide range of mixed polymers or copolymers may be prepared by mixing the desired unsaturates, cooling and polymerizing in the presence of the nitrite ester diluent.

The ethylenically unsaturated material is chosen according to the properties desired in the resin to be produced. If a replacement for caoutchouc is to be made, the mixture preferably contains a major proportion of isobutylene and a minor proportion of a multi olefin such as isoprene, or dimethyl butadiene, there being, for this purpose, the commercially preferable multi-olefins, because of the ready availability and ease of copolymerization; the preferred polymerization temperature being between —40° C. and —103° C.

If a hard resin of relatively low melting point is to be prepared, a higher polymerization temperature is used, and a higher proportion of multiolefin is used, and some other mono olefin than isobutylene is used. For this reaction, the octene obtained by dimerization of isobutylene is particularly suitable for the mono olefin, and butadiene is particularly suitable for the multi-olefin, the preferred range being from 30% to 80% of the multi-olefin. The mixture is prepared at any convenient temperature, preferably between about +10° C. and —35° C., and is diluted with from 0.05 volume to about 2.5 volumes of an organic nitrite.

The organic nitrites preferred as diluents are ethyl nitrite or amyl nitrite because of their commercial availability, and of these two, the ethyl nitrite is preferred because of the substantial absence of toxicity. It may be noted that for most reactions the methyl and ethyl nitrites are preferred and are much superior as diluents. However, the choice of nitrite ester depends to a considerable extent, upon the choice of Friedel-Crafts catalyst. For most reactions the ethyl or methyl nitrite is preferred with boron trifluoride or titanium tetra chloride as catalyst. It should be noted that aluminum chloride has relatively strong secondary valences and the nitrite esters are polar compounds because of the presence of oxygen therein, and also have relatively strong secondary valences which tend to interact with the aluminum chloride and modify the polymerization power and characteristics of the aluminum chloride. Thus, it appears that aluminum chloride is not a preferred catalyst with the nitrite esters for most reactions although it is not known whether a partial complex is formed between the nitrite ester and the aluminum chloride or whether the powerful reactivity of the aluminum chloride partially de-esterifies the nitrite ester and forms a complex with the freed ethyl radical. In any event, boron trifluoride and titanium tetra chloride are the preferred catalysts, perhaps because of the much lower tendency of these two catalysts to de-esterify the nitrite, or perhaps because of the fact that any de-esterification which may occur would yield a free ethyl radical which would have an activating effect on the boron trifluoride or perhaps because the formation of a partial complex in boron trifluoride increases the catalytic power of the catalyst. However, for many reactions this modification in catalytic power of aluminum chloride is very valuable and in these reactions nitrite esters are highly useful diluents, since they modify the catalyst, yield the desirable character of polymers which come from diluents containing polymerizate mixtures and in addition they give a clean precipitation of the polymer from the reaction mixture as thus formed. This property of clean precipitation is particularly valuable in practically all reactions, whether an elastomer is being produced, or a hard resin, or a liquid polymer, and the effect is particularly valuable when the molecular weight of the polymer is relatively high, since it is the higher molecular polymers which are most difficult to free from absorbed diluent.

The mixture having been prepared at any convenient temperature, the temperature is set at an appropriate value, depending upon the type of polymerization to be conducted. If simple polyisobutylene is to be produced, the temperature may be adjusted between 0° C. and —103° C. according to the molecular weight desired in the finished polymer. If a replacement for caoutchouc is to be made, the temperature is preferably adjusted within the range between —40° C. and —103° C. If a hard resin is to be made, the temperature is preferably adjusted between about +10 and about —35° C.

The ethylenically unsaturated material mixture will contain as a diluent from 0.1 part to 10 parts of the nitrite ester; for most reactions, the preferred amount being from ⅕ volume to 2 volumes of the nitrite ester. When the temperature has been placed at the desired value, the polymerization is conducted by the addition to the cold mixture of an appropriate Friedel-Crafts catalyst. For producing polyisobutylene the preferred catalyst is boron trifluoride which may be added as a gas or may be added in solution in any convenient solvent. For styrene polymerization $BF_3$ or $TiCl_4$ may be used.

For the catalyst solvent, an additional portion of alkyl nitrite may be used or ethyl or methyl chloride or chloroform or ethylene dichloride or the like may be used. Alternatively, solvents such as carbon disulfide or the lower boiling hydrocarbons may be used. The solvent to be low freezing must have a freezing point below 0° C. To be non-complex forming there shall not separate from the solution on the evaporization of the solvent, a compound containing both Friedel-Crafts catalyst and solvent. The amount of catalyst substance required ranges from 0.3% to about 4%, of the olefinic material depending upon the catalyst chosen, the amount and character of impurities in the polymerization mixture, and the per cent of total polymerization desired.

When higher molecular weight polymers are desired it is usually preferable to use boron trifluoride. However, for other polymerizations where lower molecular weights are desired, this choice no longer holds and any of the Friedel-Crafts catalyst substances disclosed by N. O. Calloway in his article on "The Friedel-Crafts synthesis" printed in the issue of "Chemical Reviews" published for the American Chemical Society at Baltimore in 1935, in volume XVII, No. 3, the article beginning on page 327, the list being particularly well shown on page 375, may be used. Of the Friedel-Crafts catalysts, $BF_3$ as a gas or in solution is the most potent, titanium tetrachloride is nearly as good (in this system), and the other halides are more or less useful according to the particular polymerization being conducted.

The catalyst is advantageously stirred into the cold unsaturated material as quickly as possible and it is preferable that the unsaturated material be very strongly stirred, up to the point where the amount of mechanical energy of the stirring introduces an undesirable amount of heat energy. The catalyst is preferably introduced into the body of the cold liquid and stirred in and dispersed as quickly as possible. In the case of gaseous boron trifluoride, the gas catalyst may be added in the form of a fine stream from a small bore jet or through an Alundum thimble or by other convenient similar means. If the catalyst is liquid, it may be added in the form of a fine, high-pressure jet into the body of the solution, or in the form of a spray onto the surface of the rapidly stirred material, either method being quite satisfactory. The resulting polymer may range from a heavy oil having a very low iodine number through an elastic material of moderate iodine number to a hard resin of relatively high iodine number.

The essence of the invention is found in the admixture with the ethylenically unsaturated material of an organic nitrite ester in substantial amounts to obtain the advantages of polymerization from a diluent-containing mixture, without interference with the polymerization reaction, and simultaneously ease of polymerization and ease of separation of the polymer from the polymerization mixture.

It is essential for the purposes of the present invention that the nitrite ester be substantially free from troublesome impurities, particularly the alcohols, which are normal ingredients in commercial nitrite esters. The nitrites may conveniently be purified by treatment with sodium and subsequent fractional distillation. It is desirable that if ethyl nitrite is used, it should have as high a purity as possible, preferably containing less than 0.005% of alcohol, ethyl ether, or the like. It should show a specific gravity of 0.9015 at 15° C. and a boiling point of 17° C.

Example 1

A mixture was prepared consisting of 200 grams of isobutylene having a 98% purity and 10 grams of ethyl nitrite substantially free from alcohol and ethyl ether. This material was cooled to a temperature of −78° C., by the addition thereto of substantial quantities of pulverized solid carbon dioxide, and the material was polymerized by the addition of a stream of gaseous boron trifluoride. Sufficient catalyst was added to convert approximately 85% of the isobutylene to polymer which was found to have a Staudinger molecular weight number of approximately 26,000. This product was soluble in mineral oil.

Example 2

A similar mixture was prepared consisting of equal parts of isobutylene and ethyl nitrite substantially free from alcohol and ethyl ether and the material was cooled by the application of a refrigerating jacket containing liquid ethane to the reactor. When the temperature of the mixture had reached a temperature close to −88° C., that is below −85° C., a stream of gaseous boron trifluoride was introduced and continued until approximately 63% of the isobutylene had polymerized. The polymer was removed and found to have a Staudinger molecular weight number of approximately 38,000.

Example 3

A similar polymerization was prepared consisting of 100 grams of pure isobutylene and 20 grams of pure ethyl nitrite and cooled by a jacket of liquid ethylene around the reactor to a temperature close to −103° C., below −98° C., and a stream of boron trifluoride was added as before. Sufficient catalyst was used to polymerize approximately 71% of the isobutylene present and a polymer having a Staudinger molecular weight number of approximately 97,000 was obtained. These results show the non-interference of the pure nitrite ester with the polymerization reaction.

Example 4

A mixture was prepared consisting of 100 grams isobutylene containing 1.5% of dimethyl butadiene, and 50 grams pure ethyl nitrite and cooled to a temperature close to −88° C. by a liquid ethane refrigerating jacket on the reactor. A stream of boron trifluoride was added to the mixture and continued until approximately 58% of the mixed olefins had polymerized. The resulting polymer showed a Staudinger molecular weight number of approximately 44,000, an iodine number of approximately 1.2, and an excellent reactivity with sulfur in the presence of tetramethyl thiuram disulfide and paraquinone dioxime and dinitroso benzene to yield a cured polymer, various samples of which showed tensile strengths at break ranging between 1800 and 2400 pounds per square inch with elongations at break ranging between 1000 and 1200%, with moduli (pounds pull per square inch to stretch the sample by 300%) ranging from 350 to 600. It will be noted that this is a high-grade replacement for some rubbers.

In all of these examples, it was found that the olefinic material was readily soluble in and compatible with the nitrite ester, and, in addition, it was found that the polymer was insoluble in; and solvated by, the nitrite ester to a very slight or negligible extent; and the solubility of the liquid nitrite ester in the solid polymer was found to be extremely low. Accordingly, a slurry was obtained with no tendency for adhesion of the polymer to the walls of the reactor and no difficulty in discharging the polymer completely from the reactor.

*Example 5*

A mixture was prepared consisting of 100 parts by weight of vinyl isobutyl ether and 50 parts by weight of pure ethyl nitrite. To this mixture there was then added approximately 150 parts by weight of pulverized solid $CO_2$ (Dry Ice). When the mixture had been brought down to a temperature $-78°$ C., a stream of gaseous boron trifluoride was added to the mixture, the whole being held in a heat insulated reactor. About 30 seconds after the beginning of the addition of the catalyst, a polymerization reaction began. This was indicated by the volatilization of large amounts of $CO_2$ from the heat of the reaction, and a considerable quantity of polymer precipitated. When the evolution of heat began to moderate somewhat, approximately 10 parts by weight of isopropyl alcohol were added to the mixture to inactivate the $BF_3$ catalyst and the mixture was allowed to stand until all the $CO_2$ had been vaporized and the mixture brought up nearly to room temperature. The polymer was then washed with water and dried. The yield was found to be 74 parts by weight of polymer having a Staudinger molecular weight number of about 22,000. This polymer is a thick, sticky, semi-solid polymer which is soluble in mineral oil but insoluble in water or alcohol. This semi-solid polymer is found to be an excellent softener and processing aid for the synthetic rubbers.

*Example 6*

A mixture was prepared consisting of equal parts by weight of vinyl isobutyl ether and purified ethyl nitrite. No refrigerant was used, but the material was held at room temperature (approximately 20° C.) and a slow stream of boron trifluoride gas was added to the mixture. The polymerization reaction began promptly and continued with a slight rise in temperature until more than ¾ of the ether was polymerized, at which time the mixture was dumped into warm water to volatilize out the nitrite and dissolve the unpolymerized ether. The resulting polymer was found to be an oil having excellent physical properties. Upon test it was found that the oil obtained had a viscosity at 100° F., 1,650 centistokes; and at 210° F., 81.8 centistokes. These values indicate a very high viscosity index; an index so high has to be above the value readable from any of the previously prepared viscosity index charts, but a viscosity index probably about 185. The material further was found to have excellent lubricating properties and to be, as prepared, a good lubricant.

Similar polymerizations were conducted at 25° C. and 30° C. to yield relatively light lubricating oils having similar excellent properties; and at temperatures of 10° C. and 0° C. to yield relatively very high viscosity oils with the same valuable properties. Thus it is possible to prepare a series of lubricants of excellent lubricating power, high viscosity index and a range of viscosities by the adjustment of the polymerization temperatures to adapt them to a wide range of lubricating services, by the polymerization of unsaturated ethers in the presence of alkyl nitrites by Friedel-Crafts catalyst, at temperatures in the neighborhood of room temperatures, that is, between 0° C. and $+30°$ C.

Also, the oil polymer is found to be readily soluble in hydro-carbon oils and when so dissolved, it gives an excellent viscosity index to the lubricating oil solution and an excellent sludge dispersing action and an excellent detergent effect on internal combustion engines.

Thus the invention provides a new polymerization mixture for ethylenically unsaturated materials in a low temperature polymerization reaction containing an olefinic nitrite having from 1 to 6 carbon atoms per molecule to yield an improved and simplified polymerization process for the production of high-grade polymers in which process a minimum of loss of diluent occurs and a minimum of interference in the polymerization occurs, while the advantages of polymerization in the presence of a diluent are obtained in full.

While there are above disclosed but a limited number of embodiments of the process of the invention, it is possible to produce still other embodiments without departing from the inventive concept herein disclosed and it is therefore desired that only such limitations be imposed on the appended claims as are stated therein or required by the prior art.

The invention claimed is:

1. The polymerization process comprising the steps of mixing together vinyl isobutyl ether and as a diluent a nitrite ester having from 1 to 5 carbon atoms per molecule at a temperature within the range between $+10°$ C. and $-164°$ C. and polymerizing said ether in the presence of said diluent by the application thereto of a Friedel-Crafts catalyst in solution in said diluent.

2. The polymerization process comprising the steps of mixing together vinyl isobutyl ether and as a diluent a nitrite ester having from 1 to 5 carbon atoms per molecule at a temperature within the range between $+10°$ C. and $-164°$ C. and polymerizing said ether in the presence of said diluent by the application thereto of a $BF_3$ catalyst in solution in a low-freezing non-complex-forming solvent comprising said diluent.

3. The polymerization process as in claim 2 wherein the catalyst is $TiCl_4$.

DAVID W. YOUNG.
HARRIS D. HINELINE.

REFERENCES CITED

The following references are of record in the file of this patent:

UNITED STATES PATENTS

| Number | Name | Date |
|---|---|---|
| 2,061,934 | Cunradi | Nov. 24, 1936 |
| 2,356,130 | Thomas | Aug. 22, 1944 |
| 2,399,626 | Coffman | May 7, 1946 |
| 2,412,921 | Sparks | Dec. 17, 1946 |

FOREIGN PATENTS

| Number | Country | Date |
|---|---|---|
| 378,544 | Great Britain | Aug. 18, 1932 |

OTHER REFERENCES

Lange's "Handbook of Chemistry" (1941), pp. 286, 378, and 420.